United States Patent Office.

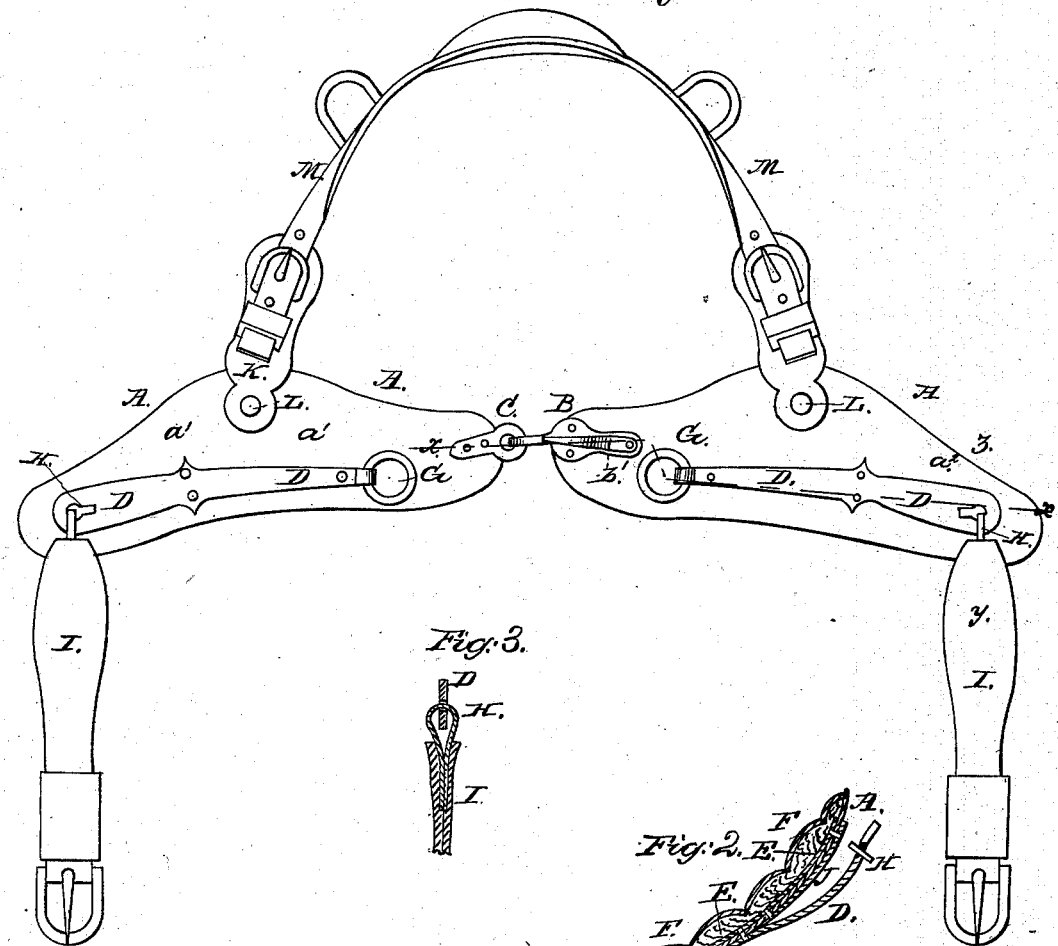

IMPROVEMENT IN HAME-TUG AND BREAST-COLLAR.

A. McMULLEN, OF STERLING, ILLINOIS.

Letters Patent No. 60,031, dated November 27, 1866.

SPECIFICATION.

TO ALL WHOM IT MAY CONCERN:

Be it known that I, ADAM McMULLEN, of Sterling, in the county of Whiteside, and State of Illinois, have invented a new and useful Improvement in Hame-Tug Breast-Collar; and I do hereby declare that the following is a full, clear, and exact description thereof, which will enable others skilled in the art to make and use the same, reference being had to the accompanying drawings, forming part of this specification, in which—

Figure 1 is a front view of my improved hame-tug breast-collar.

Figure 2 is a detail sectional view of the same, taken through the line $x\ x$, fig. 1.

Figure 3 is a detail sectional view of the same, taken through the line $y\ y$, fig. 1.

Similar letters of reference indicate like parts.

My invention has for its object to furnish an improved breast-collar, so constructed and arranged as to cover the parts of the horse's breast upon which the draught comes, affording an easier and better purchase than the breast-collar now in general use, and which can be readily taken off and put on the horse. And it consists, first, of a breast-collar made in two parts, said parts being constructed and arranged in the form and manner hereinafter described; second, in the combination of the plates with the collar, with the hame-tug clips, and with the breast-strap rings; third, in the combination of the snap hook and eye with the forward ends of the parts of the collar; and, fourth, in pivoting the neck-strap tugs to the collar; the whole being constructed and arranged as hereinafter more fully described.

A is the collar, the parts $a^1$ and $a^2$ of which are cut out in the form shown in the drawings. This form causes the collar to fit easily upon the horse's breast, and gives a broad bearing surface upon that part of his breast where the draught strain comes. B is a hook securely riveted to the forward end of the part, $a^2$, of the collar A. $b'$ is a spring, one end of which is attached to the shank of the hook, B, and the other end rests against the point of the hook, as shown in fig. 2. C is an eye, the shank of which is riveted to the forward end of the part, $a^1$, of the collar, A, as shown in figs. 1 and 2. This snap hook and eye holds the parts of the collar securely connected when upon the horse, and enables them to be readily detached for convenience in removing the collar from or putting it upon the horse. D are plates secured to the outer sides of the parts, $a^1$ and $a^2$, of the collar, A, by rivets; said rivets passing through the plates, D, through the collar, and through the strengthening plates, E, placed between the collar, A, and the pad, F, as shown in fig. 2. To the forward ends of the plates, D, are attached the breast-strap rings, G, for holding up the tongue of the carriage. When the collar is used for single harness the rings, G, are left off. H are the hame-tug clips, which are passed through holes in the rear ends of the plates, D, and are secured to the ends of the hame-tugs, I, in the ordinary manner. J are small plates riveted to the collar beneath the rear ends of the plate, D, to prevent the clips, H, from chafing the collar. K are the neck-strap tugs, which are pivoted to the upper parts of the parts, $a^1$ and $a^2$, of the collar by large-headed rivets, L, as shown in fig. 1. M is the neck-strap, about the construction of which there is nothing new. F is the pad, which is made and attached to the collar in the ordinary manner.

I am aware that a breast-strap has been made in two parts, as in my invention, but these parts have heretofore been connected by a rigid piece of curved metal, securely fastened by rivets to the two parts of the breast-strap in order to prevent interference with the respiratory organs of the horse, whilst in my invention the two parts of the breast-strap are connected by a snap hook and eye, by means of which the two parts of the breast-strap can easily be disconnected from each other at the front and the breast-strap placed in proper position on the horse without passing the strap, M, over the horse's head, as usual, which is troublesome, in consequence of said strap becoming entangled with the blinds of the bridle when the snap is passed over his head.

Having thus fully described my invention, what I claim as new, and desire to secure by Letters Patent, is—

1. The breast-strap A, made in two parts, $a^1$ and $a^2$, connected by a strap hook and eye, when said parts are constructed in the form and manner substantially as herein shown and described, and for the purpose set forth.

2. The breast-collar A, in combination with the plates D and J, and the tug-clips H, substantially as described and for the purpose set forth.

3. Pivoting the neck-strap tugs K to the parts, $a^1$ and $a^2$, of the collar A, so that the position of the neck-strap on the neck can be changed when desired, substantially as described and for the purpose set forth.

ADAM McMULLEN.

Witnesses:
ALBERT J. STURTEVANT,
J. C. TEATZ.